United States Patent [19]

Wistuba et al.

[11] Patent Number: 4,746,074
[45] Date of Patent: May 24, 1988

[54] GRINDING DEVICE FOR DRUM-TYPE CHOPPER

[75] Inventors: Eberhard Wistuba, Rettenbach; Martin Nusser, Niederstotzingen; Xaver Lenzer, Koetz, all of Fed. Rep. of Germany

[73] Assignee: Karl Mengele & Söhne GmbH & Co., Günzberg, Fed. Rep. of Germany

[21] Appl. No.: 916,284

[22] Filed: Oct. 7, 1986

[30] Foreign Application Priority Data

Oct. 8, 1985 [DE] Fed. Rep. of Germany ....... 3535909

[51] Int. Cl.⁴ .................... B02C 18/16; B24B 19/00
[52] U.S. Cl. .................................. 241/101.2; 51/249
[58] Field of Search ................ 241/101.2, 241, 101.1, 241/235, 236, 294; 51/249, 246

[56] References Cited

U.S. PATENT DOCUMENTS 2,848,030  8/1958  Rudszinat ...................... 241/101.2
3,479,776  11/1969  Berg ........................... 241/101.2 X
3,958,766  5/1976  Shriver ......................... 241/101.2

FOREIGN PATENT DOCUMENTS 14275  of 1912  United Kingdom .

Primary Examiner—Mark Rosenbaum
Attorney, Agent, or Firm—Toren, McGeady & Associates

[57] ABSTRACT

In a drum type chopper, a drum, rotatable about a stationary axis, mounts cutters which co-act with a counter knife in effecting a chopping action. A cylindrical grinding wheel is positioned to sharpen the cutters on the drum. The grinding wheel is movable between a rest position and a grinding position relative to the cutters. The grinding wheel has an axial length corresponding approximately to the axial length of the drum. Further, during the grinding operation, the grinding wheel is rotated and reciprocated relative to the same axis.

7 Claims, 1 Drawing Sheet

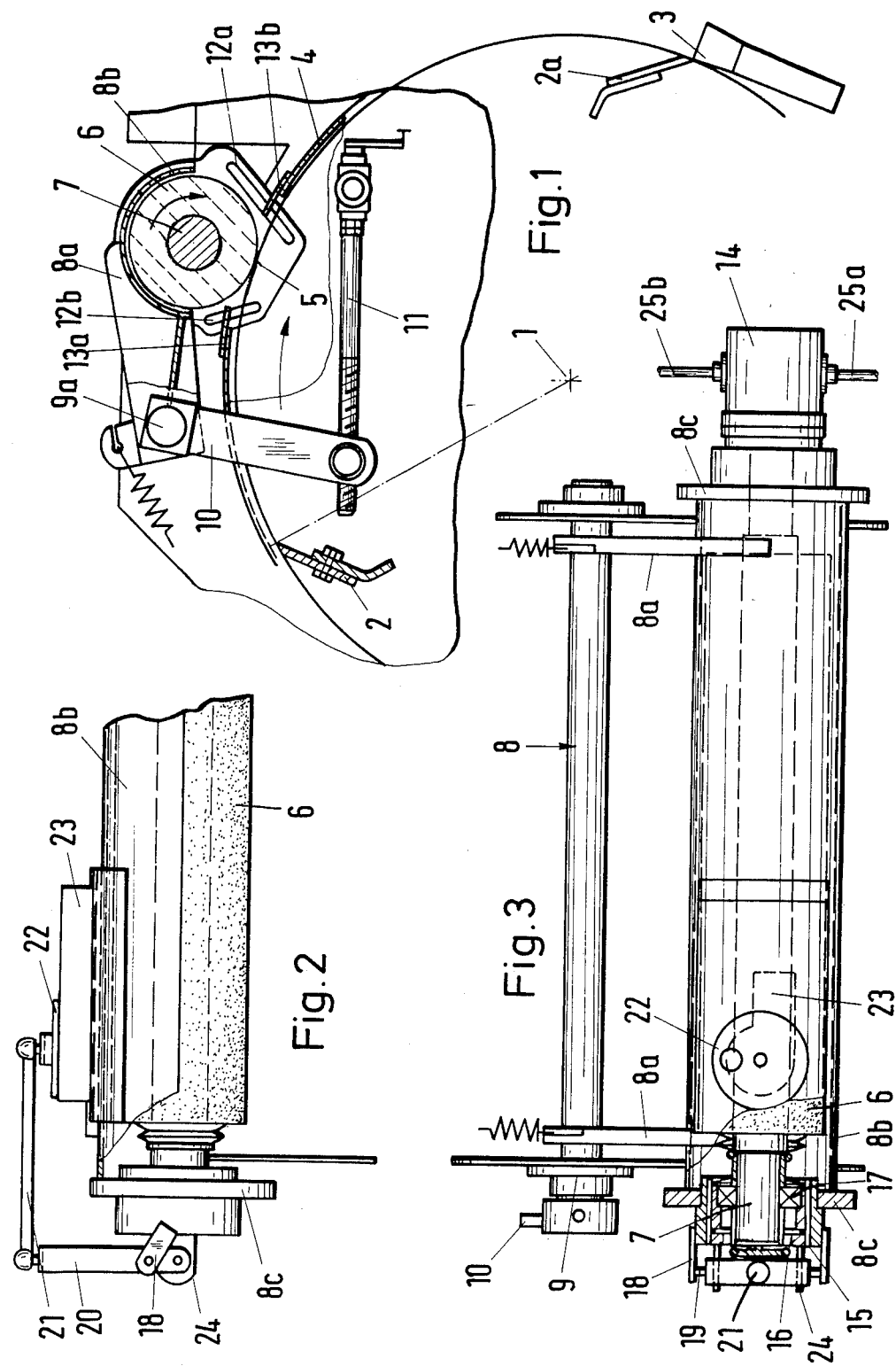

GRINDING DEVICE FOR DRUM-TYPE CHOPPER

The invention is directed to a chopper or similar crusher with at least one cutter rotating around an axis, which is rigid in the machine, whose cutting edge sweeps past an opposing knife edge and whose wearing surface is facing the knife edge and extends in the surface or plane defined by the revolving cutter cutting edge, wherein a rotationally shaped grinding body built into the machine and extending in its operational position approximately parallel to the cutter approximately across its length or across the plane of revolution of its cutting edge is arranged to be advanceable to the cutter in the operational position of same.

From the GB-PS No. 14 275 a disc wheel chopper is known in which a conical freely rotatable grinding disc can be applied to the wearing surfaces of the cutters by means of a feed device.

The cutter disc of the chopper is made to rotate in order to sharpen it, whereby the cutters sweep with their wearing surfaces past the grinding member and impart rotation to same. This is intended to cause a uniform wear of the grinding member.

Because of damage to the cutting edges of the cutters it can, however, occur that the grinding member is subjected to a greater wear at the corresponding spots, so that the cutting edges are non-uniformly ground during further subsequent grinding. Apart from that the cutting speed in the known grinding device is low and because of this the quality of the cutting edges leaves something to be desired.

Contrary to that the task of the invention consists in avoiding damage to the grinding member and to attain a better grinding performance.

An embodiment example of the invention is described in the drawing and explained with particularity.

It is shown on:

FIG. 1 a partial side view of a drum type chopper with the grinding device in accordance with the invention;

FIG. 2 is a front view of the grinding device according to FIG. 1;

FIG. 3 is a plan view of the grinding device according to FIG. 2.

In the drawing the rotational axis of a cutter drum is designated with 1 and the cutters arranged externally at same are designated with 2. The cutter 2a can be seen in engagement with opposing cutter counter knife 3.

A rectangular aperture 5 is provided at the top at the housing 4 embracing the cutter drum, into which there projects a cylindrical grinding member or wheel 6 during the grinding process, as illustrated. The grinding member or wheel 6 with its shaft 7 is supported on both sides in arms 8a of a rocker 8 with centers of rotation 9a of an axis 9. 8b is an upper cover of the grinding member 6 and an adjustment lever 10 is attached at one of the rocker arms 8a, said adjustment lever being actuatable by a spindle drive 11 and with which the grinding member can be brought into a working grinding or rest position. In the position of rest the aperture 5 is closed by closing plates 13a and 13b guided in control slots 12a and 12b which closing plates are attached to the rocker 8.

According to FIG. 3 the grinding member 6 is powered by an hydraulic oil motor 14 depicted on the right-hand side. On the other side of the grinding member respectively one front wall 8c is fastened at the side ends of the covering 8b, which presses bearing bushes 15 into a central bore. In said bore an axially displaceable bearing block 16 is provided in which a ball-bearing 17 supporting the shaft 7 is arranged. The inner ring of the ball-bearing 17 has a forced fit on the shaft 7. Brackets 18 are arranged on both sides of the bearing bush 15. At the front of said brackets an axis is provided which serves as a center of rotation for a rocker 20. The rocker 20 is connected with a crank disc 22 by a con rod 21, said crank disc being driven by an electromotor 23. The oscillating motions of the rocker 20 generated thereby are transmitted by a bracket 24 to a sliding part an axially displaceable bearing block 16 and the grinding member 6 together with the oil motor 14 is imparted a reciprocating motion. The lines 25a and 25b of the oil motor are, for this purpose, constructed to be flexible.

We claim:

1. In a drum type chopper comprising a cutter drum rotatable about a stationary axis with said drum being elongated in the axial direction and having an outer circumferential surface, at least one cutter mounted on said drum and extending in the axial direction thereof and said cutter having a cutting edge at the outer circumferential surface of said drum, a counter knife mounted outwardly of the circumferential surface of said drum so that the cutting edge of said cutter rotates past said counter knife for effecting a cutting action, said cutting edge of said cutter facing said counter knife requires sharpening, a cylindrical grinding wheel located outwardly from the circumferential surface of said cutter drum for sharpening the cutting edge of said cutter, means for moving said grinding wheel between a grinding position adjacent the circumferential surface of said cutter drum and a rest position spaced outwardly from the circumferential surface, said grinding wheel having an axis of rotation parallel to the axis of said cutter drum, means for rotating said grinding wheel and means for reciprocating said grinding wheel in the direction of the axis of rotation thereof, wherein the improvement comprises that said grinding wheel extends in the direction of the axis of rotation for a length corresponding approximately the axial length of said cutter drum, and said means for rotating and means for reciprocating having a common axis so that said grinding wheel reciprocates along the axis of rotation thereof, said grinding wheel comprises a shaft forming said common axis, said means for rotating connected to one end of said shaft and in axial alignment therewith for rotating said grinding wheel and said reciprocating means connected to the other end of said shaft for reciprocating said grinding wheel on the common axis formed by said shaft.

2. In a drum type chopper, as set forth in claim 1, wherein the rotational direction of said grinding wheel is counter to the rotational direction of said cutter drum.

3. In a drum type chopper, as set forth in claim 1, wherein said grinding wheel rotates at a rpm and has a reciprocating frequency, the rpm and the reciprocating frequency of said grinding wheel are in fixed ratio relative to one another by a coupling means.

4. In a drum type chopper, as set forth in claim 1, wherein said grinding wheel has an adjustable reciprocating frequency.

5. In a drum type chopper, as set forth in claim 1, wherein said means for rotating said grinding wheel is a hydraulic oil motor and flexible oil lines are connected to said hydraulic oil motor for following the reciprocating movement of said grinding wheel.

6. In a drum type chopper, as set forth in claim 1, wherein said mean for reciprocating said grinding wheel comprises a motor, a crank disc driven by said motor, a connecting rod extending from said crank disc and connected at an end thereof spaced from said crank disc to a rocker, a sliding part connected on the axis of said grinding wheel, a bracket connected to said sliding part, and said rocker connected to said bracket for reciprocating said grinding wheel.

7. In a drum type chopper, as set forth in claim 1, wherein said means for rotating said grinding wheel is an hydraulic oil motor connected to the one end of said shaft, the other end of said shaft being mounted in a ball bearing, a sliding part supporting said ball bearing, a bearing bush supporting said sliding part, a bracket connected to said sliding part, and said means for reciprocating said grinding wheel secured to said bracket for effecting reciprocation on the common axis.

\* \* \* \* \*